Oct. 16, 1923.　　　V. C. SMEDLEY　　　1,470,888

DENTAL IMPRESSION TRAY

Filed March 14, 1922

Inventor
Victor C. Smedley.

By A. J. O'Brien
Attorney

Patented Oct. 16, 1923.

1,470,888

UNITED STATES PATENT OFFICE.

VICTOR CLYDE SMEDLEY, OF DENVER, COLORADO.

DENTAL IMPRESSION TRAY.

Application filed March 14, 1922. Serial No. 543,638.

*To all whom it may concern:*

Be it known that I, VICTOR CLYDE SMEDLEY, a citizen of the United States, residing at the city and county of Denver and State of Colorado, have invented certain new and useful Improvements in Dental Impression Trays; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in dental impression trays, and more particularly to a tray adapted to be filled with plastic material for the purpose of taking a mold or impression of a tooth in the mouth of a patient.

In dentistry, it frequently is desirable to obtain a model or cast of a tooth or other formation in the mouth of a patient. In order to obtain such a cast, it is necessary to apply plastic material to the tooth or other object in the mouth to obtain an impression of the same, then remove such plastic material after hardening, and finally to cast a model from the mold thus obtained. In carrying out such a process, several difficulties are encountered. In the first place, due to the inaccessibility of the tooth in the patient's mouth, it is difficult to apply the plastic material or to apply it in sufficient quantity to completely surround the tooth without spilling the same or rubbing it or its container against sensitive parts of the mouth. In the second place, since the tooth frequently is constricted at the neck, it is difficult to remove the hardened impression material from the tooth without deforming the molded impression.

In my improved dental molding tray, I have invented a device which overcomes the objections noted above. With my improved tray, it is possible to hold a small quantity of plastic material but sufficient in amount to completely surround the tooth or other object, the impression of which is desired, readily insert such plastic material into the mouth without danger of loss, and without danger of contact with or injury to other parts of the mouth, force the plastic material around the tooth so that a clear, full and distinct impression is obtained, and then remove such plastic material from the tooth without deforming the impression obtained, giving a mold in which a perfect casting may be obtained.

I accomplish the above objects by means which I will now describe in detail and which consists broadly in the combination of the two tray members of similar shape but of reversed construction, which are adapted to be held together by means of a handle which is provided at one end with upstanding spaced side pieces which are adapted to engage the outer surfaces of the tray members in a manner which will be clearly shown in the description which follows.

In order to more clearly describe my invention, I shall have reference to the accompanying drawing in which—

Figure 3:
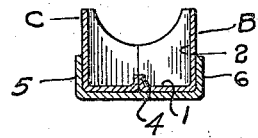
Fig. 3 is a transverse section taken on line 3—3, Fig. 1.

My improved tray consists of three parts: a holder or handle A, a right hand tray section B, and a left hand tray section C. Tray section B consists of a bottom member 1, a side member 2, an end wall 3, and an upstanding rib 4 formed by turning up the free edge of the bottom member 1. Tray member C is identical with member B except that it is reversed with respect thereto, so that the two members may be assembled as shown to form a receptacle for the reception of the plaster or other plastic impression material. In order to hold members B and C in assembled relation, I provide the handle A with a pair of similar parallel upstanding sides 5 and 6, which are so spaced that they will engage the outer surfaces of the tray members B and C and hold them securely in assembled relation in the manner clearly shown in Figs. 1, 3 and 4. It will be noted that the sides 5 and 6 are made with their engaging surfaces plane, and the parts are held in assembled relation by friction only, as by this arrangement the parts can be more easily assembled and separated, and the operation of the device as well as its construction simplified thereby.

Figure 1:
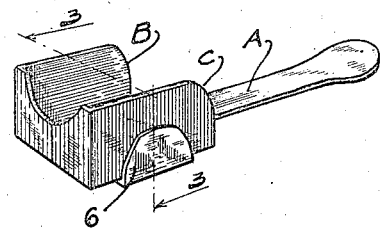
Fig. 1 shows a perspective view of my improved tray in assembled relation.
Figure 2:
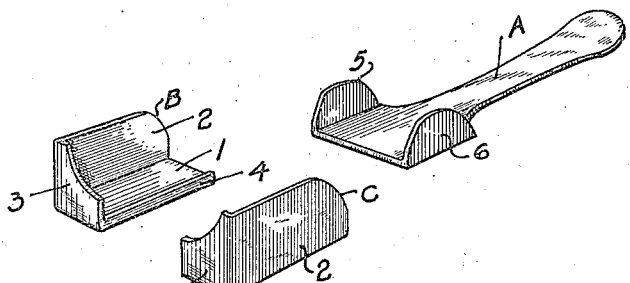
Fig. 2 is a view in perspective which shows my tray in disassembled relation.

When it is desired to utilize the tray for the purpose of taking an impression, the parts are assembled in the manner shown in Fig. 1 and the plastic material put in place within the tray formed by members B and C. The operator then holds the device by means of the handle A, inserts the tray into the mouth of the patient and presses the same over the tooth of which an impression is desired.

Figure 4:
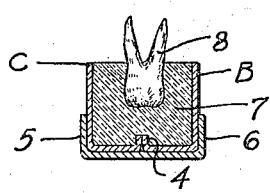
Fig. 4 is a section similar to that shown in Fig. 3, but showing the tray filled with plaster or other plastic impression material and applied to a tooth.
Figure 5:
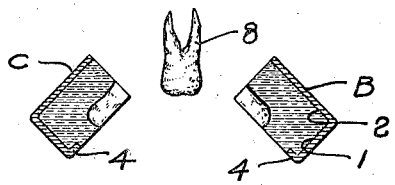
Fig. 5 is a section on line 3—3, showing the manner in which the mold is broken open for the purpose of removing it from the tooth.

In Fig. 4 I have shown my device in position about a tooth 8. The tray is left in place for the length of time that it takes the material to set or harden. When the material 7 has set, the handle A is removed, which can be readily accomplished, as it is held in place by friction only. With a suitable instrument the operator then exerts a separating force upon one or both of the sections B and C, and spreads them apart, thus causing the impression material 7 to crack along the line of ribs 4, in the manner shown in Fig. 5. The tray sections may then be removed from the patient's mouth, after which they may be reassembled. They may then be used as a mold by means of which an exact counterpart of the tooth may be cast.

The tool described above is of great practical utility and of an extremely simple construction. The parts can be entirely separated and are so made that they may be easily cleaned and sterilized. The manner in which my handle is attached is extremely simple and yet it is thoroughly effective and has been proven entirely satisfactory by a long series of practical demonstrations.

Having now described my invention, what I claim is—

1. A dental tray composed of two similar tray members adapted to be brought together to form a rectangular parallelepipedal-shaped receptacle having an open side for the reception of impression material, each of said members having along the line of contact of the bottom parts thereof an inwardly projecting rib adapted to form a line of breakage in said impression material, and means for holding said members in assembled relation, said means comprising a handle having two spaced parallel projecting members adapted to contact with the outer parallel surface of said tray members above the bottom thereof, the contact surfaces of the handle being of less area than that of the outer surface of the tray members which they engage.

2. A dental tray comprising separable halves each consisting of a bottom member, a side member, and an end member, said halves being adapted to be brought together to form a rectangular parallelepipedal-shaped receptacle for impression material, the adjacent edges of said halves being provided with upstanding ribs adapted to form a line of breakage of the impression material, and means for holding said halves in cooperative relation, said means consisting of a handle member provided at one end with spaced parallel sides adapted to frictionally engage the outer parallel surfaces of said halves above the bottom and to be removed therefrom by sliding motion, the engaging surfaces of the handle being of less area than that of the outer surface of the tray parts which they engage.

3. A dental impression tray comprising two parts, adapted when brought together to form an open-sided receptacle for impression material, said parts having a side, a bottom and an end, there being an inwardly projecting flange formed along the line of juncture of said parts and adapted to produce a weakened portion in said impression material, and means for detachably holding the aforesaid parts together, said means comprising a handle having a portion on each side constructed to engage the tray parts on opposite sides above the bottom and hold said parts together on said handle, the engaging surfaces of the handle being of less area than that of the outer surface of the tray parts which they engage.

In testimony whereof I affix my signature.

VICTOR CLYDE SMEDLEY.